(12) United States Patent
Weitbruch et al.

(10) Patent No.: US 6,977,629 B2
(45) Date of Patent: Dec. 20, 2005

(54) STEREOSCOPIC PICTURE SEPARATION FOR PHOSPHOR LAG REDUCTION IN PDP

(75) Inventors: Sébastien Weitbruch, Mönchweiler (DE); Alexa Floury, Ivry-sur-Seine (FR)

(73) Assignee: Thomson Licensing, Boulogne (FR)

(*) Notice: Subject to any disclaimer, the term of this patent is extended or adjusted under 35 U.S.C. 154(b) by 250 days.

(21) Appl. No.: 10/175,968

(22) Filed: Jun. 20, 2002

(65) Prior Publication Data

US 2002/0196199 A1 Dec. 26, 2002

(30) Foreign Application Priority Data

Jun. 23, 2001 (EP) .............................. 01250236

(51) Int. Cl.⁷ ................................................ G09G 5/00
(52) U.S. Cl. ................................................ 345/6; 345/7
(58) Field of Search ............................ 345/6, 7, 8, 63, 345/690; 22/18; 324/322; 325/324; 352/57 T; 353/6, 7; 359/462, 463; 378/41, 42; 348/42, 43, 44, 45–59

(56) References Cited

U.S. PATENT DOCUMENTS

| | | | |
|---|---|---|---|
| 3,992,573 A | 11/1976 | White | |
| 5,717,412 A | 2/1998 | Edwards | |
| 6,717,558 B1 * | 4/2004 | Weitbruch et al. | .............. 345/63 |
| 2003/0063107 A1 * | 4/2003 | Thebault et al. | .............. 345/690 |

FOREIGN PATENT DOCUMENTS

| | | |
|---|---|---|
| EP | 1058229 A1 | 12/2000 |
| JP | 01079892 | 3/1989 |
| JP | 2000112428 | 4/2000 |
| JP | 2002199416 A * | 12/2000 |

* cited by examiner

*Primary Examiner*—Vijay Shankar
*Assistant Examiner*—Nitin Patel
(74) *Attorney, Agent, or Firm*—Joseph S. Tripoli; Ronald H. Kurdyla; Vincent E. Duffy

(57) ABSTRACT

For stereoscopic displaying the new plasma display panels are providing promising results. When using shutter glasses that are controlled by the PDP, it is possible to display left and right image in short succession for stereoscopic displaying. However, there is the phosphor lag effect that is really disturbing and can totally impede the stereovision. The frame period of a stereoscopic picture is divided to at least one left period and at least one right period for the left picture and the right picture respectively. According to the invention both pictures are analyzed for similarities and the common part for a pair of corresponding pixels is determined. Sub-field code words for the left/right picture are determined having a part for the specific left/right sub-fields and a part for the common sub-fields. The common sub-fields are positioned at the end of each left/right field for the left/right picture so that the phosphor lag effect is no longer visible.

8 Claims, 7 Drawing Sheets

Right image                    Left image

Image seen by the left eye

STEREOSCOPIC PICTURE SEPARATION FOR PHOSPHOR LAG REDUCTION IN PDP

BACKGROUND OF THE INVENTION

The present invention relates to a method and device for processing video frames for stereoscopic display on a display device, particularly a Plasma Display Panel (PDP), having a plurality of luminous elements. In each case one or more of them belongs to a pixel of a video frame. Wherein each video frame includes a left and a right picture and the time duration of the video frame is divided into a plurality of sub-fields during which the luminous elements can be activated for light emission/generation in small pulses corresponding to a sub-field code word which is used for brightness control.

The 3D perception from the Human Visual System (HVS) is based on the close side-by-side positioning of the eyes. Each eye takes a view of the same area from a slightly different angle. These two separate images are sent to the brain for processing according to FIG. 1. When the two images arrive simultaneously in the back of the brain, they are united into one picture. The mind combines the two images by matching up the similarities and adding the small differences to catch finally a three-dimensional stereo picture. With stereo vision, the HVS sees an object as solid in three spatial dimensions (width, height and depth) and it is the added perception of the depth dimension that makes stereo vision so rich and special. Moreover, a stereo picture will increase the impression of sharpness in the brain.

In video technology 3D images are generated with the help of two video cameras positioned side-by-side similar to the human eyes. Other methods mainly based on complex software are also able to generate artificial stereo pictures by ray tracing (simulation of light propagation). These images shall be called, left and right images. If right and left images are displayed sequentially from a source according to FIG. 2, and a synchronized shutter system in front of the eye allows the right image to only enter the right eye and conversely for the left eye, then the stereovision can be observed. The shutter can be mounted in glasses that are matched with a display in which two constituent pictures are presented in alternation instead of simultaneously. The glasses occlude one eye and then the other in synchronism with the image displaying. This method is often called "field sequential". This method avoids the retinal rivalry caused by anaglyph viewing (other method based on a two-color glasses associated with a two-color picture—each color related to one eye and resulting in a monochrome stereoscopic vision, very old method traced back to 1858). Nevertheless, this method can introduce other discomfort such as the introduction of time parallax between the two images, or the possibility of "ghosting" between the image due to phosphor persistence.

Most glasses-shutter systems use LCDs that work with polarized light. Currently, glasses using LCDs can provide good switching speed and reasonable extinction of the alternative lenses. The electro-optical polarizing shutters available on the market today transmit only 30% of the unpolarized input light (rather than 50% for perfect polarizers) and this reduces a lot the image brightness. Some eyeglass shutters are connected by wires to the monitor, others are controlled by infrared and are wireless.

The display of stereo pictures on a Plasma screen is not a simple matter of design choice, because it needs to display two different pictures per frame period which is a new challenge for this technology if one does not want to accept a great reduction of frame repetition frequency.

A PDP utilizes a matrix array of discharge cells which can only be "ON" or "OFF". Also unlike a CRT or LCD in which gray levels are expressed by analog control of the light emission, a PDP controls the gray level by modulating the number of light pulses per frame (sustain pulses). The eye will integrate this time-modulation over a period corresponding to the eye time response. To perform a grayscale rendition, the Plasma display is commonly divided in sub-lighting periods called sub-fields each one corresponding to a bit of the input video picture data. For instance, if 8 bit luminance levels are provided, in that case each level will be represented by a combination of the 8 following bits:

1-2-4-8-1-3-6-128.

To realize such a coding with the PDP technology, the frame period will be divided in 8 lighting periods (called sub-fields), each one corresponding to a bit. The number of light pulses for the bit "2" is the double as for the bit "1", and so forth. With these 8 sub-periods, we are able through sub-field combination, to build the 256 gray levels.

For clarification, a definition of the term sub-field is given here: A sub-field is a period of time in which successively the following is being done with a cell:

1. There is a writing/addressing period in which the cell is either brought to an excited state with a high voltage or left in its neutral state with lower voltage.
2. There is a sustain period in which a gas discharge is made with short voltage pulses which lead to corresponding short lighting pulses. Of course only the cells previously excited will produce lighting pulses. There will not be a gas discharge in the cells in neutral state.
3. There is an erasing period in which the charge of the cells is quenched.

In some specific plasma driving schemes (incremented coding, proposed by Pioneer) the addressing or erasing periods are not present in each sub-field. Instead, a selective addressing/erasing is performed ahead or after a group of sub-fields.

A simple method to implement a stereoscopic display is based on the use of LCD shutter glasses and the separation of sub-fields into Left(L) and Right(R) sub-field groups which are synchronized with the opening and closing of the LCD shutter glasses. It is a further advantage of this method that with the same display 2D and 3D pictures can easily be generated by a change of the sub-field encoding process.

For the following explanations, we will make the assumption that the PDP is able to display 20 sub-fields per frame in 60 Hz mode (16.67 ms frame period). In addition we will also make the assumption that the temporal response of the shutter eyeglasses need the time of one addressing period. Obviously, all these values are only an example!

FIG. 3 shows a light emission scheme according to the assumptions made above. Ten sub-fields are assigned to each of the left and right images, for example. The numbers on top of the sub-fields denote the relative sub-field weights. The total sum of the sub-field weights is equal to 255 corresponding to the highest possible 8-bit value. In video technology the input RGB data words are 8 bit numbers that is sufficient for Standard TV quality (SDTV). The addressing periods of the sub-fields are shown in FIG. 3 but the erasing periods are not shown as they are much smaller than the addressing periods. With a 10 sub-field code, the quality of both right and left images will be good.

SUMMARY OF THE INVENTION

The stereoscopic system as described above requires the left sub-fields to be seen only by the left eye, and the right sub-fields to be seen only by the right eye. This is not assured ab initio because the green and red luminous material shows a lag effect and when shutting down the shutter for the right eye, the left eye will receive some part of luminance of the right image as well. The same situation occurs conversely when the shutter for the left eye is closed. Then Phosphor Lag effect is strong enough to destroy the stereoscopic effect, since the eye receives both right and left information. FIG. 4 shows this Phosphor Lag problem, wherein the left image is presented immediately after the right picture on the PDP. In the example shown in FIG. 4 the left eye will see a ghost image with less luminance coming from the displaying of the previous right image. Depending on the video level this ghost image can be strong enough to totally inhibit the stereoscopic vision.

FIG. 5 shows this effect on the level of the plasma cells. The red and green cells show some afterglow, i.e. they switch off with a certain time delay. This means that there is a post-luminescence of the white spot (coming from the afterglow of the red and green cells) of the right image after it has been switched off. Since simultaneously the right eye is switched off and the left eye is switched on, the post-luminescence from the right image is visible for the left eye only, so that the stereoscopic effect is lost (compare FIG. 4). The same effect occurs on the right eye after the left image has been displayed and the shutter for the left eye is closed. It can be that the effect for the left eye is not as severe as for the right eye in case the frame period is slightly longer than shown in FIG. 5 and includes a kind of a blanking period at the end. This can be necessary for the reason that for non-standard video sources the video line may be subject of jittering and to make sure that all sub-fields fit into the jittering video line, the total amount of time for all sub-fields is slightly shorter than a standard video line. Video signals from VCR's, video game devices, etc. can show this jittering.

In view of that, it is an object of the present invention to provide a method and a device which enable stereoscopic displaying although Phosphor elements are used for displaying.

According to the present invention this object is solved by a method according to claim 1 and a device according to claim 6.

The method according to the invention is based on a specific reorganization of sub-fields. From a further European Patent Application of the applicant having the application number 01103185.3 it is known a concept in which for corresponding pixels of the original left picture and the original right picture sub-field code words are determined that have identical entries for a number of sub-fields called common sub-fields. This idea is based on the observation that in stereoscopic vision most of the corresponding picture elements in the left and right picture have great similarities. Apart from the common sub-fields there are specific right and specific left sub-fields for the right and left pictures. The common sub-fields can be grouped together and then they are positioned in the frame period between the group of specific left sub-fields and the group of specific right sub-fields. The opening periods of the shutters for the left and right eye overlap during the period where the common sub-fields are positioned. This allows for the production of more light pulses in the left and right picture and the stereoscopic pictures are much brighter. In another embodiment of this application the sub-fields of the groups can be arranged in interleaved fashion for reducing the time parallax problem.

For the effective phosphor lag effect reduction it is now the general idea of a first embodiment of the invention to duplicate the group of common sub-fields preferably with reduced sub-field weights and to position a common sub-field group behind the specific right sub-field group and behind the specific left sub-field group. With this sub-field arrangement it is assured that the ghost image from the left picture seen by the right eye is originating from the group of common sub-fields the light of which is dedicated to both eyes anyhow. The same holds for the ghost image of the right picture conversely. Advantageously the Phosphor Lag effect is reduced in case of stereoscopic displaying and no flicker is introduced.

A corresponding apparatus for processing video frames for stereoscopic display is claimed in claim 6.

An alternative concept of the invention is based on the idea to use only a few sub-fields for the right and left sub-fields and to position the sub-fields at the beginning of the corresponding field periods for the right and left picture so that at the end of each field period a relatively big blanking period remains in which the cells are not activated for light emission. This assures that the afterglow of the cells activated in the sub-fields before the blanking period basically falls in the following blanking period. The switching over from one shutter to the other is made after the blanking period and thus the ghost image is inhibited or at least very much reduced.

BRIEF DESCRIPTION OF THE DRAWINGS

Exemplary embodiments of the invention are illustrated in the drawings and are explained in more detail in the following description.

In the drawings.

DESCRIPTION OF THE PREFERRED EMBODIMENTS

Preferred embodiments of the present invention will be explained along with FIGS. 6 to 10.

A first embodiment of the invention is based on a specific-common sub-field encoding with stereoscopic pictures separation as mentioned above. The principle of the specific-common sub-field encoding is described in the previous application EP 01103185.3 of the applicant. For the purpose of the disclosure of this application it is therefore expressively referred also to the former application. The basic idea behind this concept is to apply three images instead of two: instead of the right and left images, three images, namely a specific-right one, a specific-left one and a common one are considered.

This concept is based on the fact that the two original pictures are two views from the same scene with lots of similarities. A pair of Right(R) and Left(L) images will be converted in three pictures: Specific Right(R'), Specific Left(L') and (C') which is the common one. This conversion is made as following:

For each pixel of the screen:
(C')=comm((L), (R))
(R')=(R)−(C')
(L')=(L)−(C')

where comm((L), (R)) is a common part of the video values of (R) and (L).

The sub-field encoding is done for the three images and it results a sub-field organization in which there is a juxtaposition of the sub-fields for the specific-left picture, the common picture and the specific-right picture. The opening periods of the shutter for the left eye and right eye overlap during the sub-fields of the common picture.

Figure 1:
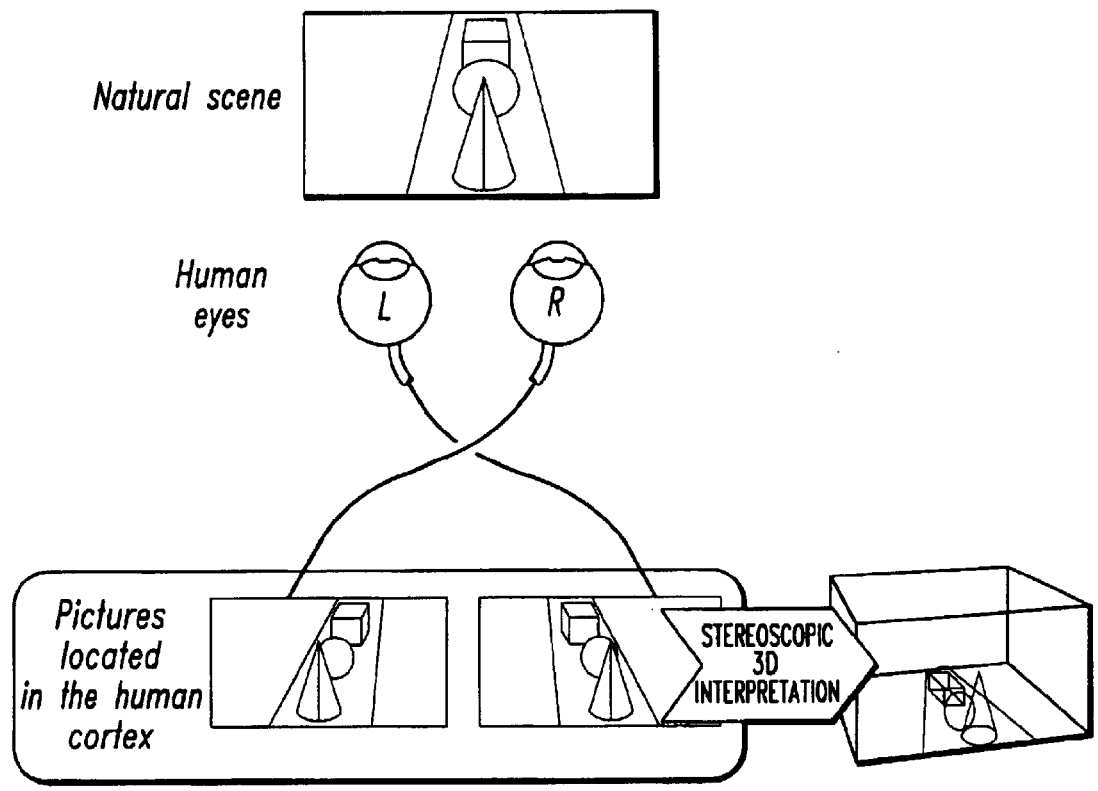
FIG. 1 shows the principle of stereoscopic vision.
Figure 2:
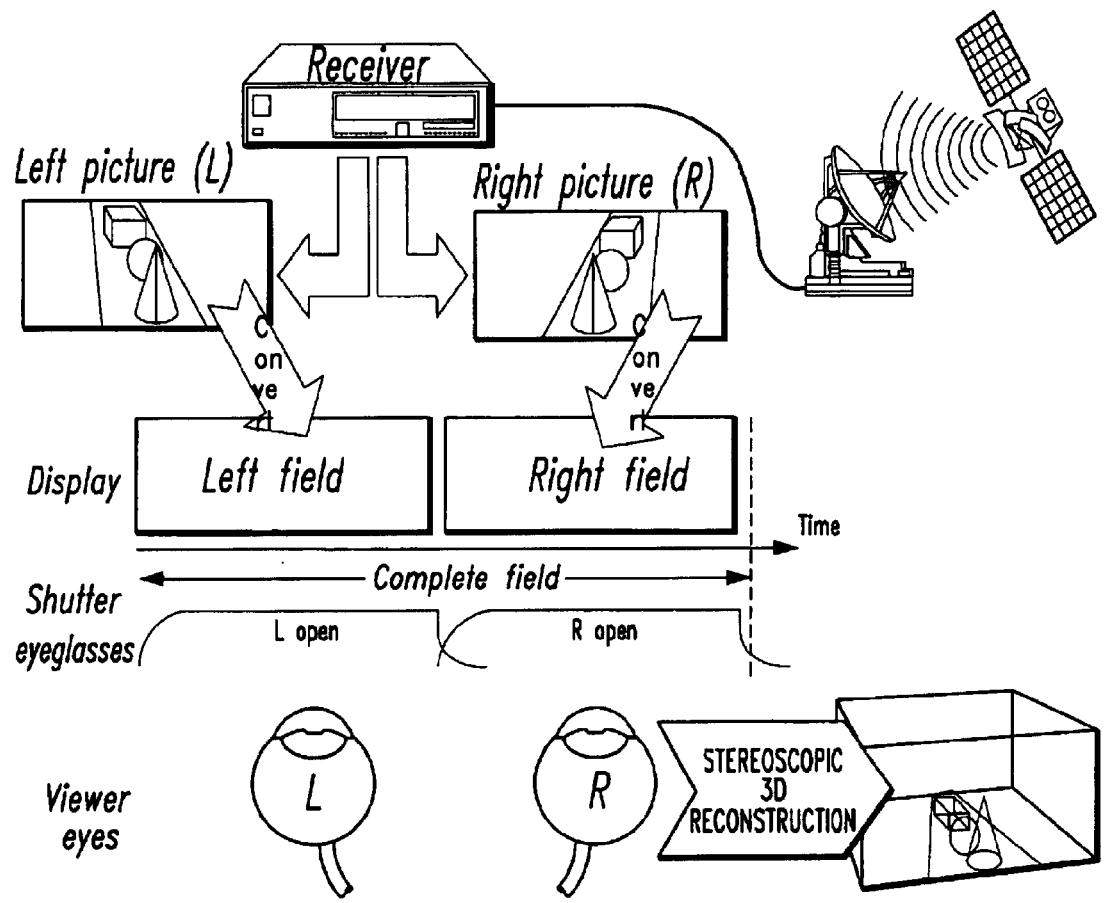
FIG. 2 shows the principle of stereoscopic displaying with sequential-field encoding.
Figure 3:
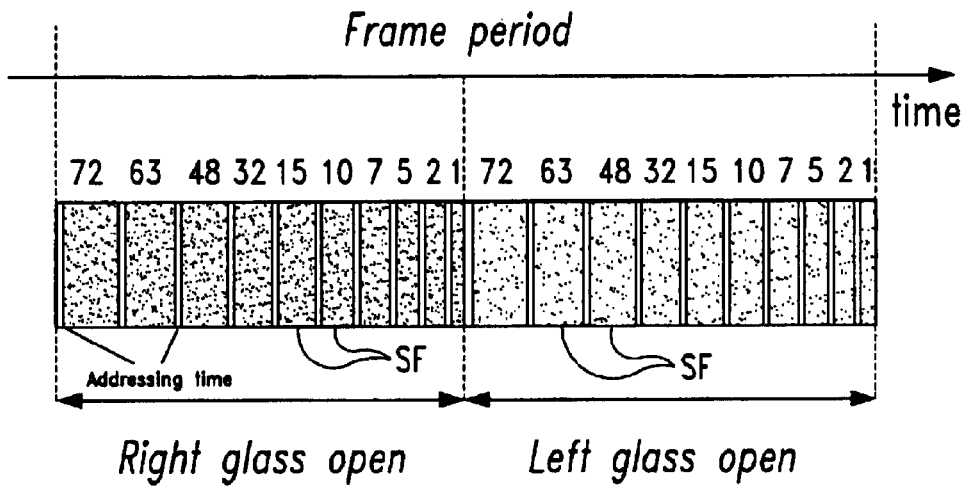
FIG. 3 shows a scheme of sub-field encoding for a stereoscopic frame.
Figure 4:
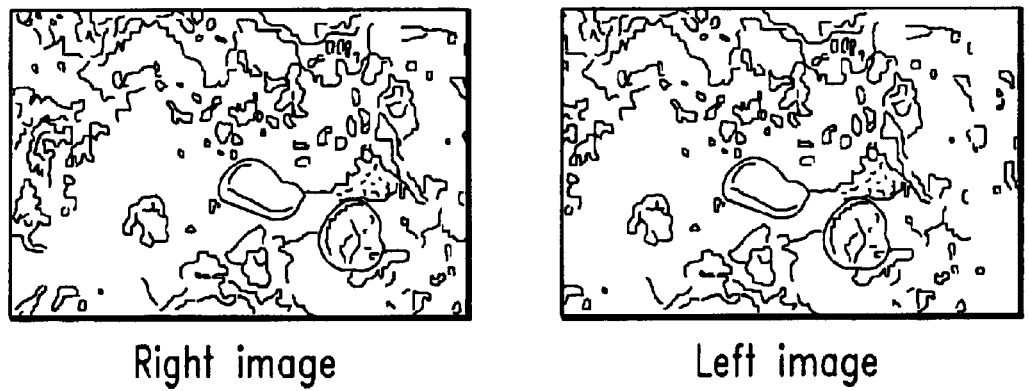
FIG. 4 shows an example of a stereoscopic picture showing the Phosphor Lag effect.
Figure 4:
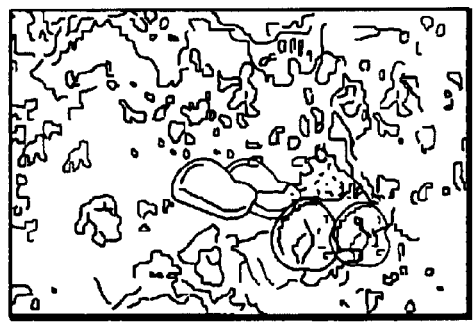
Figure 5:
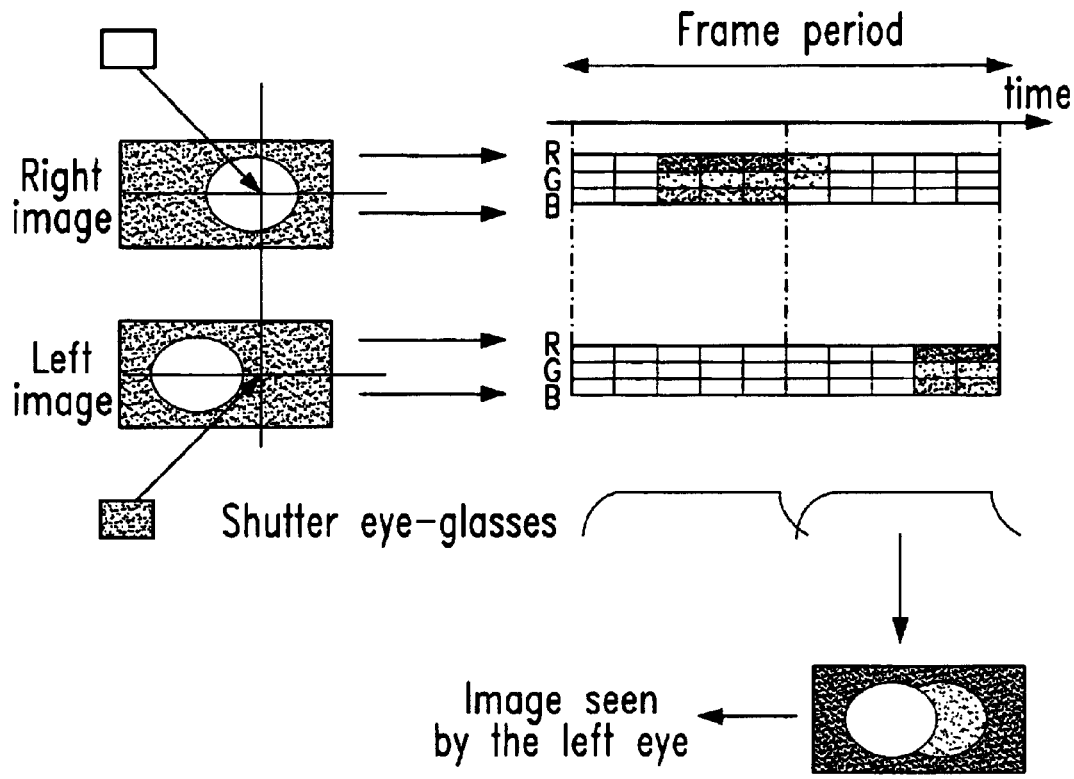
FIG. 5 shows a principle scheme of the Phosphor Lag effect.
Figure 6:
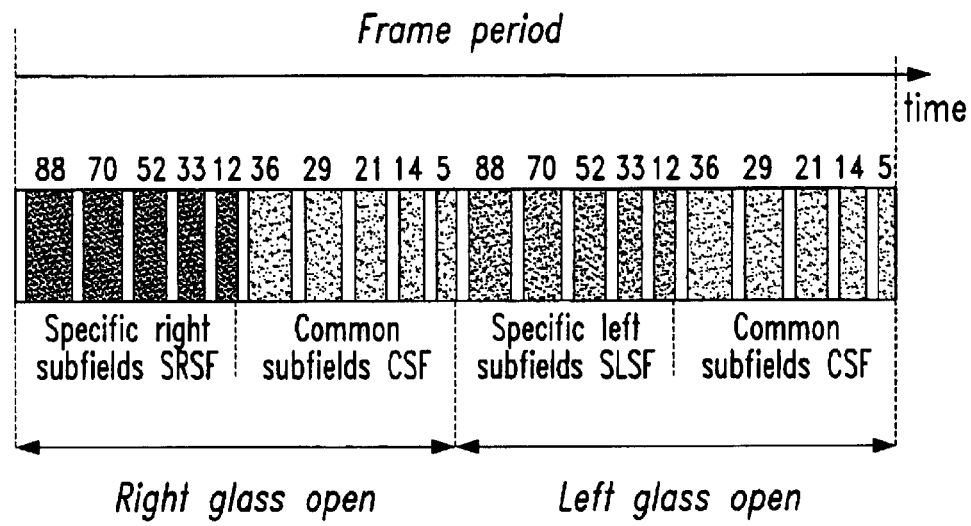
FIG. 6 shows a sub-field organization according to a first embodiment of the present invention.
Figure 7:
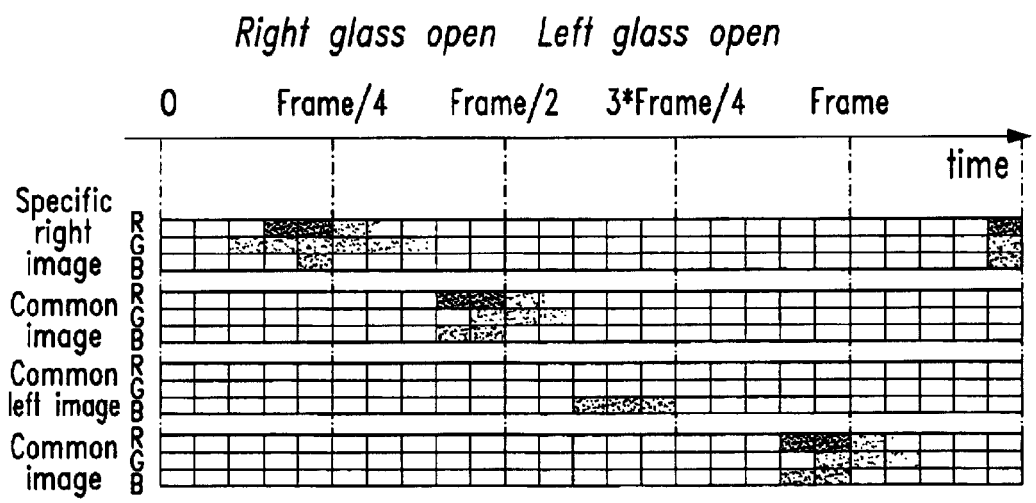
FIG. 7 shows a principle scheme of the Phosphor Lag effect when using the sub-field organization according to FIG. 6.

Starting from the recognition that there is no problem if the cells that are activated during the common sub-fields perform afterglow during the sub-fields of the specific right or left image, since the light coming from the common sub-fields is dedicated to be seen by both eyes anyhow, the basic principle of the invention resides in the duplication of the common sub-fields and the arrangement of one common sub-field group behind the sub-field group for the specific left picture and the second common sub-field group behind the sub-field group for the specific right picture. FIG. 6 shows an example based on this principle with the display of four components ((R'), (L') and twice (C')). In the example twenty sub-fields are available in a frame period. The stereoscopic effect shown in FIG. 3 is primarily based on the specific left and right sub-fields. Thus, an afterglow of the cell activated during the specific left sub-fields to the right eye would destroy the stereoscopic effect and vice versa. Therefore, the specific left sub-fields, the specific right sub-fields and the common sub-fields are arranged according to FIG. 6. As already discussed, the post-luminescence of common sub-fields of the right image to the left eye does not affect the stereoscopic effect, since these common sub-fields are identical to those of the left image, which themselves provide the same post-luminescence to the right eye. FIG. 7 shows the resulting phosphor lag effect in such a configuration.

In other words, the sub-fields of the specific right image lag on the first common sub-fields, which is not a problem, since those common sub-fields are seen by the right eye. When the shutter glasses switch to the left eye, the common sub-fields lag on the specific left ones, which is not a problem since these common sub-fields are repeated after the specific left ones and so will be also seen by the left eye. The same observation can be made about the left specific sub-fields. Moreover, the common sub-fields in the left part will lag on the right part of the next frame, which is not a serious problem. The light generated during this common part is seen by both eyes anyhow and the repetition of this light in the next frame can lead to some sort of a colored trail behind a moving object but it will not destroy the stereoscopic effect. This corresponds to a classic Phosphor Lag effect. Additionally, the intensity of light generated during the common sub-fields is reduced anyhow due to the duplication.

Next, an example of encoding two similar pixels from the left and the right image will be explained with the help of FIG. 8. The values given below are just an example and the principle is used likewise for the encoding of different values.

The principle of the Specific-Common encoding is based on the use of a common value between the two images. In the present case the maximum allowed common value is 40. If one of the two values is smaller than 40, then the smaller value equals the common value.

In the example, the pixels studied have the following R, G, B values:

In the right image: R: 207; G: 186; B: 137; in the left image: R: 52; G: 19; B: 137.

As the common value chosen is 40, one can write:

For the right pixel:
R: 207=40+167
G: 186=19+167
B: 137=40+97

For the left pixel:
R: 52=40+12
G: 19=19+0
B: 137=40+97

The numbers in bold represent the common parts in this example. Taking a 5 sub-fields code with the following weights: 12-33-52-70-88 for the specific values, and the 5 sub-fields code 36-29-21-14-5 for the common value, the encoding for the three channels Red, Green, Blue, is as following:

For the Red channel: the common value is 40, the specific right value is 167, and the specific-left value is 12.

For the Green channel: the common value 19, the specific right value is 167, and the specific-left value is 0.

For the Blue channel: the common value is 40, the specific right value is 97, and the specific-left value is 97.

Consequently the encoding for the Red channel is:
Common value: 40=5+14+21
Specific Right value: 167=12+33+52+70
Specific Left value: 12=12

Figure 8:
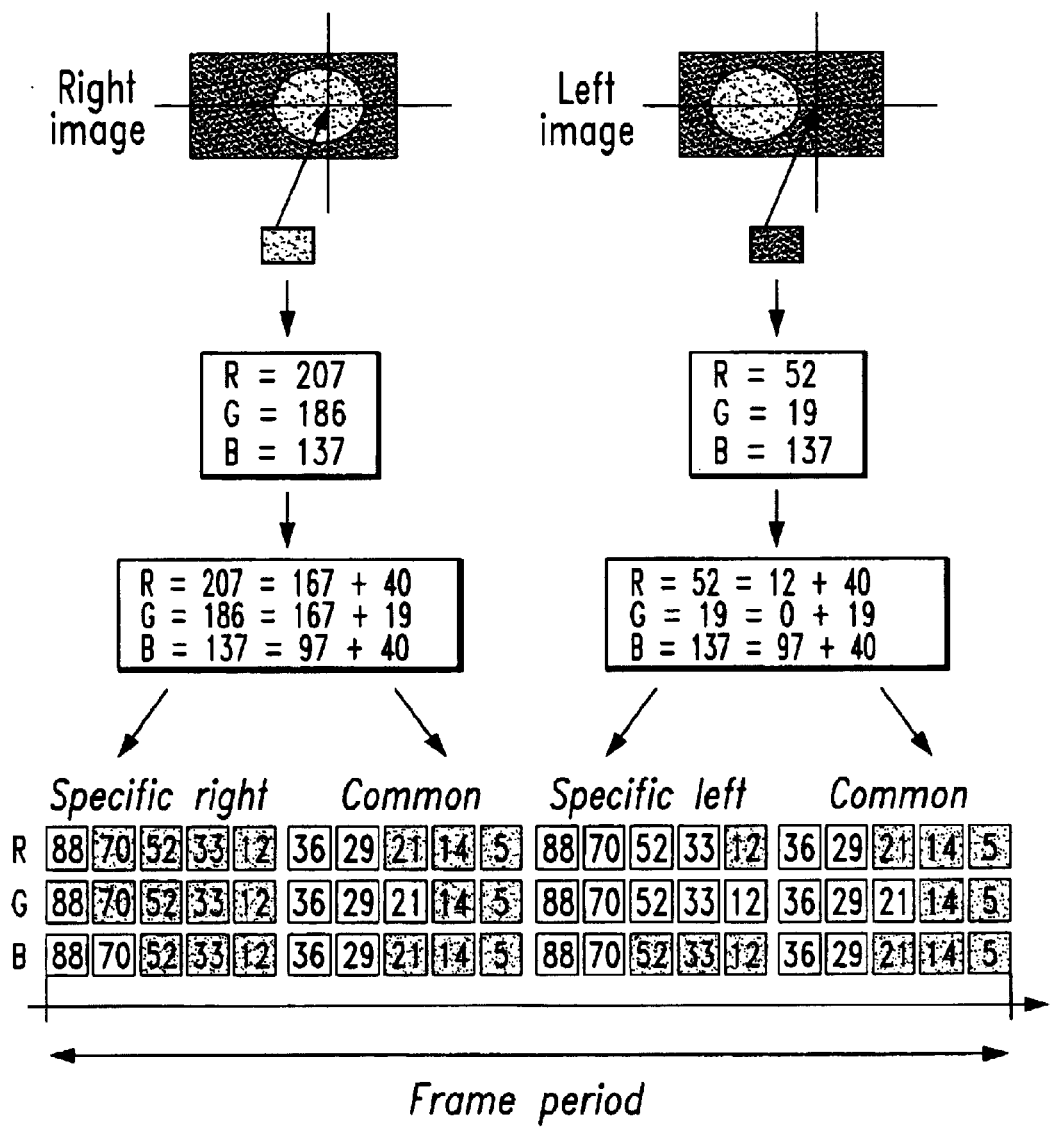
FIG. 8 shows an illustration of the sub-field encoding process according to the present invention by means of a concrete example.

FIG. 8 shows the encoding process for all three channels. In the example shown the values for the common and specific part can be encoded without loss. In other examples it may be necessary to accept some coding losses. Of course, in such a case the next nearest value should preferably replace the original one.

At present it is not feasible to encode the full video level range from 0 . . . 255 with the common sub-fields and to do the same with the specific sub-fields. Therefore, it is better to define a maximum value for the common part and to use at least one sub-field for the common part that is smaller in weight than the smallest sub-field for the specific part. With this measure it is possible to refine the gray scale portrayal particularly in the lower video range where the human eye is more sensitive.

The disclosed encoding process provides a stereoscopic displaying without much Phosphor Lag effect nor flickering and an acceptable video quality with a good gray scale portrayal. Furthermore, such encoding is applicable to all displays useable for stereoscopy and suffering from Phosphor decay time (i.e.: LCD, LCOS, etc.).

Figure 9:
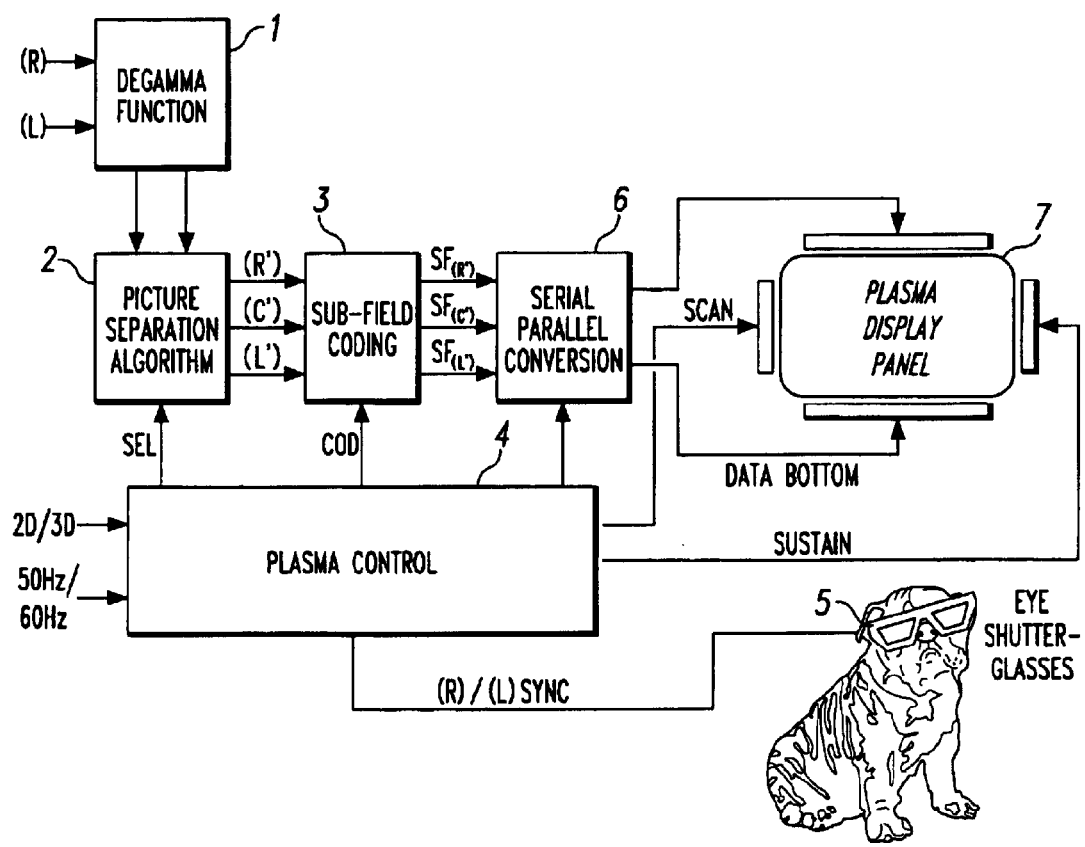
FIG. 9 shows a block diagram for a circuit implementation of the device according to the invention.

FIG. 9 describes a possible circuit implementation of the invention described above.

Input Right (R) and Left (L) pictures are forwarded to a degamma function block 1. The output of this block 1 is forwarded to a picture separation unit 2 which generates three pictures L', C' and R' from the original input R and L pictures. The three pictures are forwarded to a sub-field encoder 3 to obtain three sub-field codes $SF_{(R')}$, $SF_{(C')}$ and $SF_{(L')}$. A plasma control unit 4, depending on the defined mode (2D or 3D activated, 50 Hz or 60 Hz mode) activates or deactivates the picture separation algorithm 2 with a signal SEL and selects the correct sub-fields encoding algorithm with a signal COD. This block generates all the plasma control signals priming, scan, sustain and erase and, furthermore, it generates all needed synchronization signals for the shutter eyeglasses 5.

The codes for the sub-fields SRSF, SLSF and CSF are input one after the other to a serial-parallel conversion unit 6, where the signals DATA TOP and DATA BOTTOM are generated for the top and bottom drivers of a plasma display panel 7. The codes for the common sub-fields CSF are fed twice to the serial-parallel conversion unit 6 so that the complete code word for the frame period is set up as shown in FIG. 8.

At last, another embodiment of the invention is described that is very simple. Since the red and green Phosphor elements take time to switch off, time is given to the red and green Phosphor elements to switch off in order not to destroy the stereoscopic effect.

Figure 10:
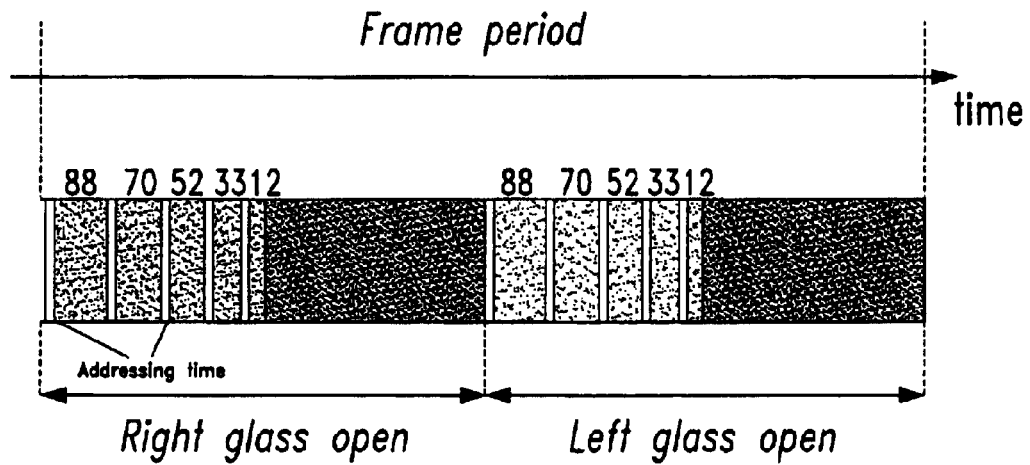
FIG. 10 shows a sub-field organization according to a second embodiment of the present invention.

For instance considering an encoding with 20 sub-fields per frame as before. Ten sub-fields will be assigned to each eye, thus to each image. The principle is as follows: if there is given time to the phosphors to switch off between each image, there won't be any phosphor lag effect preventing from the stereoscopic effect. Thus, for example only half of the time available will be used for the encoding of each left and right image (e.g. only 5 sub-fields per image), so the phosphors can afterglow the rest of the time. FIG. 10 illustrates this encoding principle.

This solution certainly has the disadvantage of a reduced video quality with respect to gray scale portrayal. The dithering technique allows improving a poor gray scale portrayal and should be used in this embodiment, too. For more details regarding this technique it is expressively referred to another European Application of the applicant having the application number 00250099.9. Thanks to the dithering achieved by the sub-fields-encoding it is possible to create artificially more levels in the picture. But, as soon as only five sub-fields are used to encode one image, the quality remains much lower than with a 10 sub-fields encoding. That's one reason why the first presented solution is somehow superior.

What is claimed:

1. Method for processing video frames for stereoscopic display on a display device having a plurality of luminous elements, in each case one or more of them corresponding to a pixel of a video frame, wherein each video frame includes a left and a right picture, and the frame period of the video frame is divided into a plurality of sub-fields during which the luminous elements can be activated for light emission in pulses corresponding to a sub-field code word which is used for brightness control and wherein for corresponding pixels left and right picture sub-field code words are determined which have identical entries for a number of sub-fields called common sub-fields and the remaining sub-fields of each picture are called specific sub-fields characterized in that, the common sub-fields are duplicated and positioned twice in the frame period with respect to the order of presentation, namely behind the specific sub-fields of the left picture and behind the specific sub-fields of the right picture.

2. Method according to claim 1, wherein the frame period of the video frame is divided into a left period for the left picture and a right period for the right picture.

3. Method according to claim 2, wherein the sub-fields within one frame period are arranged in the following order: specific left sub-fields, common sub-fields, specific right sub-fields and common sub-fields, or in the order specific right sub-fields, common sub-fields, specific left sub-fields and common sub-fields.

4. Method according to claim 2, wherein the right shutter of shutter eye-glasses opens during the right period and the left shutter of the shutter eye-glasses opens during the left period.

5. Device for processing video frames for stereoscopic display on a display device having a plurality of luminous elements, in each case one or more of them corresponding to a pixel of a video frame, wherein a video frame is used for displaying a left and a right picture, including sub-field coding means for dividing the frame period of a video frame into a plurality of sub-fields during which the luminous elements can be activated for light emission in pulses corresponding to a sub-field code word which is used for brightness control, and having sub-field coding means for determining for corresponding pixels left and right picture sub-field code words which have identical entries for a number of sub-fields called common sub-fields and the remaining sub-fields of each picture are called specific sub-fields, characterized by, control means that duplicate the common sub-fields and arrange the specific sub-fields of the left picture ahead of the first duplication of the common sub-fields and the specific sub-fields of the right picture ahead of the second duplication of the common sub-fields with respect to the order of presentation in the frame period.

6. Device according to claim 5, wherein said control means divide the frame period of the video frame into a left period for the left picture and a right period for the right picture.

7. Device according to claim 6, wherein the control means arrange the sub-fields within one frame period in the following order: specific left sub-fields, common sub-fields, specific right sub-fields and common sub-fields, or in the order: specific right sub-fields, common sub-fields, specific left sub-fields and common sub-fields.

8. Device according to claim 6, wherein shutter eye-glasses are controlled by the control means in that the right shutter of the shutter eye-glasses opens during the right period and the left glass of the shutter eye-glasses opens during the left period.

* * * * *